(12) United States Patent
Bekri

(10) Patent No.: US 9,426,584 B2
(45) Date of Patent: Aug. 23, 2016

(54) DIRECTION INDICATIVE HEARING APPARATUS AND METHOD

(71) Applicant: Umm Al-Qura University, Makkah (SA)

(72) Inventor: Mohamed Siraj Mohamed Bekri, Makkah (SA)

(73) Assignee: Umm Al-Qura University, Makkah (SA)

( * ) Notice: Subject to any disclaimer, the term of this patent is extended or adjusted under 35 U.S.C. 154(b) by 41 days.

(21) Appl. No.: 14/505,651

(22) Filed: Oct. 3, 2014

(65) Prior Publication Data

US 2016/0100258 A1    Apr. 7, 2016

(51) Int. Cl.
  *H04R 25/00*    (2006.01)
(52) U.S. Cl.
  CPC .............. *H04R 25/40* (2013.01); *H04R 25/407* (2013.01); *H04R 25/552* (2013.01); *H04R 25/554* (2013.01); *H04R 2201/403* (2013.01); *H04R 2430/20* (2013.01)
(58) Field of Classification Search
  CPC ............ H04R 1/22; H04R 1/222; H04R 1/38; H04R 1/406; H04R 25/405; H04R 25/552; H04R 25/554; H04R 2201/403; H04R 2225/021; H04R 25/40; H04R 25/407; H04R 2430/20; G02C 11/06
  USPC ........ 381/23.1, 312, 313, 322, 324, 327, 330, 381/381, 91, 92, 355, 356, 357; 351/158
  See application file for complete search history.

(56) References Cited

U.S. PATENT DOCUMENTS

| 3,665,121 | A |   | 5/1972  | Weiss |            |
|-----------|---|---|---------|---------------|------------|
| 3,770,911 | A |   | 11/1973 | Knowles et al.|            |
| 3,789,163 | A |   | 1/1974  | Dunlavy       |            |
| 4,773,095 | A | * | 9/1988  | Zwicker       | H04R 1/406 |
|           |   |   |         |               | 381/313    |
| 4,904,078 | A | * | 2/1990  | Gorike        | G02C 11/06 |
|           |   |   |         |               | 351/158    |
| 6,148,087 | A |   | 11/2000 | Martin        |            |
| 8,139,801 | B2|   | 3/2012  | Sipkema et al.|            |

* cited by examiner

*Primary Examiner* — Huyen D Le
(74) *Attorney, Agent, or Firm* — Hauptman Ham, LLP

(57) ABSTRACT

A directional indicative hearing apparatus comprises or consists of a pair of hearing aids and an eyeglass frame having a bridge and a pair of temples for positioning the eyeglasses and hearing apparatus on an individual's head. The microphones are disposed in or on the temples together with a pair of vibrators and batteries for indicating whether the sound emanates from the right, the left or behind an individual. In addition, the apparatus includes a pair of LEDs for indicating if the sound is emanating from the right, the left or in front of the individual.

8 Claims, 2 Drawing Sheets

DIRECTION INDICATIVE HEARING APPARATUS AND METHOD

FIELD OF THE INVENTION

This invention relates to a direction indicative hearing apparatus and a method for detecting the direction of sound and more particularly to a spectacle disposed directional indicative hearing apparatus and method.

BACKGROUND OF THE INVENTION

Directional indicative hearing aids are well known and have been in use for many years. For example, a U.S. Patent of Weiss, U.S. Pat. No. 3,665,121 issued in 1972 discloses a spectacle mounted directional responsive hearing aid. The hearing aid includes a pair of eyeglass supports connected by a bridge and a pair of temple members hingedly connected thereto. A respective microphone is received in each support and converts sound vibrations into corresponding electric signals. A respective amplifying device in the frame is connected to each microphone for amplifying the electric signals and converting the signals to amplified sound vibrations. A respective sound applicator is connected to each amplifying device for applying the sound vibrations from the associated amplifying device to each ear of the user. The pair of microphones permits realization of the spatial resolution of the sound.

A more recent U.S. Patent of Martin, U.S. Pat. No. 6,148,087 discloses a hearing aid having two hearing apparatuses with optical signal transmission therebetween. For binaural hearing, a hearing aid worn at the head has two hearing apparatuses respectively allocated to the ears, with at least one of the hearing apparatuses having a transmitter and the other hearing apparatus having a receiver for an optical signal transmission from the transmitting hearing apparatus to the receiving hearing apparatus.

Finally, a U.S. Patent of Sipkema et al., U.S. Pat. No. 8,139,801 discloses hearing glasses with a left temple and a right temple connected to a front portion supporting a pair of lenses. At least one of the temples includes one microphone and a processor is connected to the single microphone. The single microphone is an omnidirectional microphone and located in the temple such that when the hearing glasses are worn by a human's head where the at least one temple is at a predetermined side of the head, the single microphone can receive sound substantially unblocked by the head from sound sources both at a left and right frontal side of the head, as well as from one back side of the head corresponding to the predetermined side of the head.

Notwithstanding the above, it is presently believed that there is a need and a potential market for a new directional indicative hearing apparatus that includes a pair of hearing aids and a spectacle frame having a pair of head engaging temples in which one of the pair of hearing aids is disposed within or on one of the temples. There should be a need and a potential market for such devices that are based on more modern technology. Accordingly, it is believed that there is a demand for the apparatus in accordance with the present invention.

SUMMARY OF THE INVENTION

In essence, the present invention contemplates a directional indicative hearing apparatus comprising and/or consisting of a pair of hearing aids each of which includes a microphone and an eyeglass frame including a pair of temples for engaging the sides of an individual's head. One of the hearing aids includes a microphone and is disposed in or on each of the head engaging temples. In addition, a vibrator is disposed in or on each of the temples while a pair of LEDs disposed on a rear surface of the eyeglass frame with one of the LEDs on a left side of the frame and the second of the LEDs is disposed on the right side of the frame. Also a central processing unit (CPU) is operatively connected to each of the hearing aids, each of the vibrators, each of the LEDs and a directional indicator for sensing the direction of a sound emanation. In response to the direction indicator, the CPU activates the vibrator and the LED on the nearest side of the individual from the sound emanation and when the sound emanation is from the opposite side, the CPU activator activates the vibrator and LED on the opposite side and when the sound emanates from behind the individual, the CPU activates both vibrators but no LED and when the sound emanates from the front of the individual the CPU activates both LEDs but neither vibrator.

The invention will now be described in connection with the accompanying drawings wherein like reference numbers have been used to identify like parts.

DESCRIPTION OF THE PREFERRED EMBODIMENTS OF THE INVENTION

Figure 1:
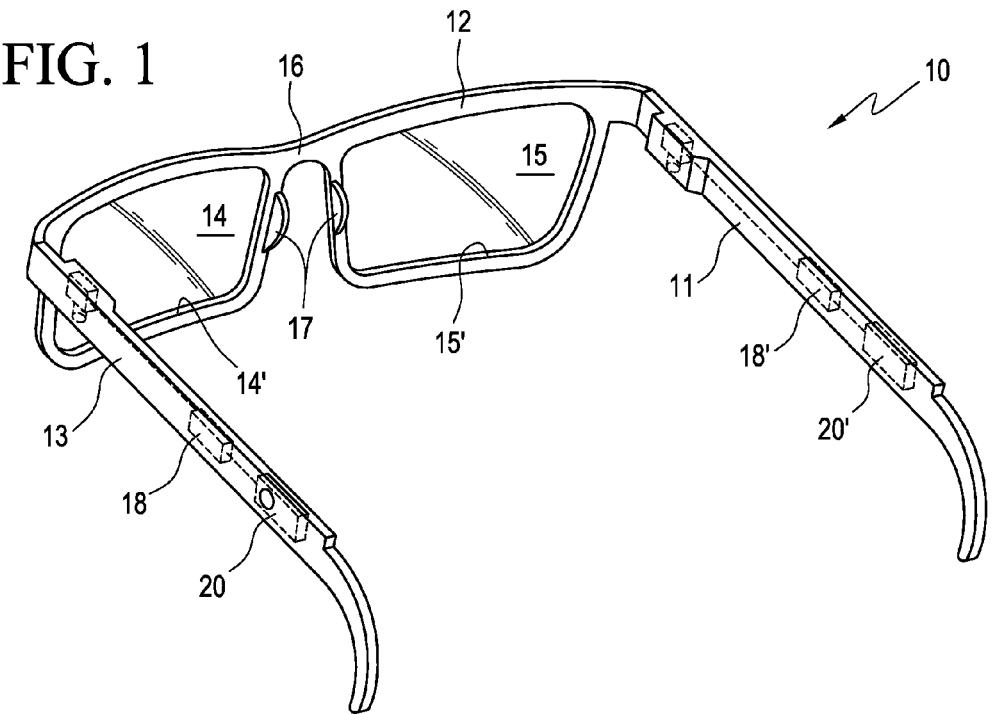
FIG. 1 is a perspective illustration of a direction indicative hearing apparatus in accordance with a first embodiment of the invention.

Referring now to FIG. 1, a directional indicative hearing apparatus 10 includes an eyeglass frame 12 having a pair of head engaging temples 11 and 13 hingedly attached to the outer edges of the frame 12. The frame 12 accommodates a pair of spectacles or lenses 14 and 15 disposed in front of an individual's eyes. The frame 12 also includes a bridge 16 for joining the lens mounting members 14' and 15'. The frame 12 also includes a pair of nose pads 17 for supporting the spectacles on the nose of the individual. The temples engage the side of the head and position the glasses in front of an individual's eyes.

The direction indicative hearing apparatus 10 also includes a pair of hearing aids 18 and 20 that are disposed within or on each of the temples 11 and 13 with one hearing aid disposed in or on each of the temples 11 and 13. Each of the hearing aids 18 and 20 includes a microphone and is disposed within or on one of the temples 11 and 13. The temples 11 and 13 are essentially conventional but may be somewhat larger to accommodate the hearing aid, batteries, to power the hearing aids and vibrators which contact each side of an individual's head.

Each of the hearing aids 18, 18' and 20, 20' include a microphone that are connected to an earpiece that is placed in a human ear and may include a loud speaker. In addition, each temple 11 and 13 includes a battery 22 and 24 arranged to provide electrical power to the electrical components of the hearing apparatus 10.

Figure 2:
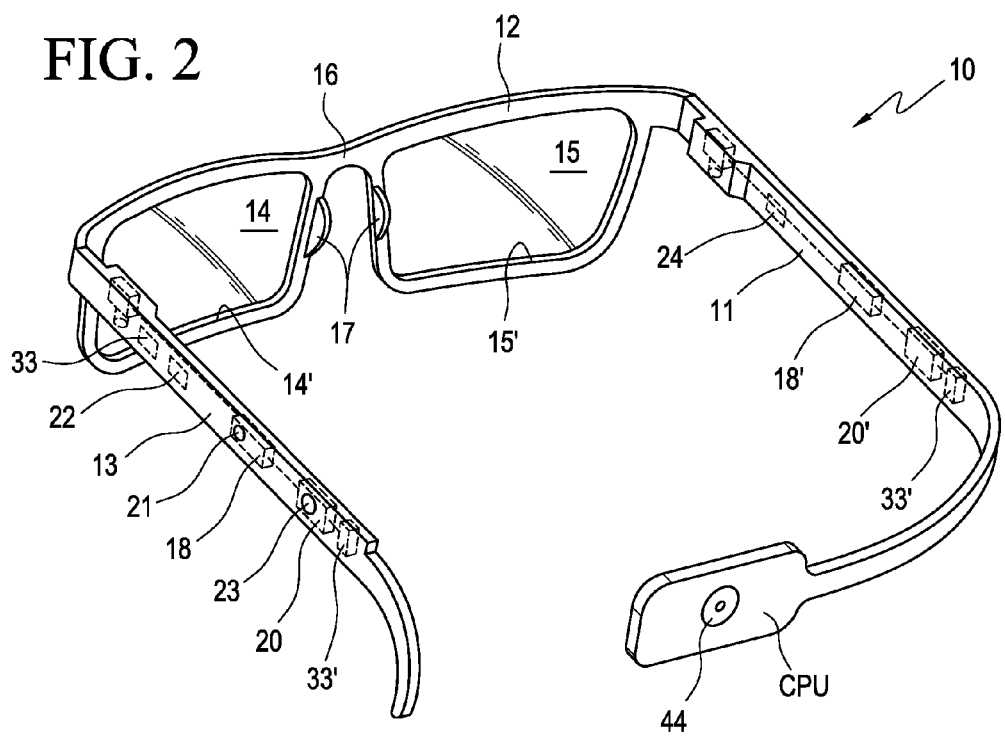
FIG. 2 is a perspective view of a direction individual hearing apparatus in accordance with a second embodiment of the invention.

As illustrated in FIG. 2, the hearing apparatus 10 includes four hearing aids 18, 18', 20 and 20' each of which includes a microphone 21, 23 as illustrated only in the left temple. For example, the hearing aid 18 and microphone 21 are disposed in a forward part of the temple 13 while the hearing aid 18 and 20 and microphone 23 are disposed on the rear part of the temple 13. In a similar arrangement, the hearing aid 18' and microphone 21 are disposed in a forward part of the temple while the hearing aid 20 and associated microphone are disposed in the aft or rear portion of the temple.

The position of the microphones each have inlets for receiving sound at a forward side of the hearing apparatus while associated microphones each have inlets for receiving sounds from the back of the hearing apparatus 10. Therefore, when both LEDs are lit the individual will recognize that the sound is coming from the front of the individual. On the other hand, if the vibrators and LEDs are both activated on one side an individual knows that the sound is coming from that side and if from the opposite side that the sound is coming from the opposite side.

In the operation of the hearing apparatus the CPU is programmed to detect the signal strength of the sound sensed by each of the four sensors wherein one sensor will have a signal strength lower than the others due to the individual's head blocking sounds received from the opposite area. Based on the result of the signal strength, the CPU indicates that the sound is emanating in the opposite direction. The second microphone is in a rear portion of the temple behind the ear of the individual.

Figure 3:
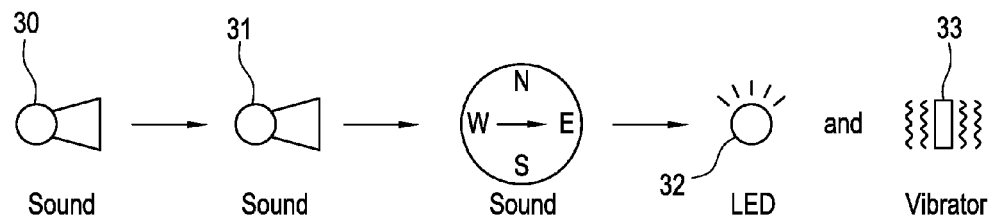
FIG. 3 is a schematic illustration of an additional embodiment of the invention.

As illustrated in FIG. 3, a further embodiment of the invention four microphones 30 and 31 and/or four LEDs and/or vibrators may be used to give a general indication from which sound is originated. For example, two microphones may be placed in each temple with one on a forward part of a temple and one on a rear portion of the temple. A first LED 32 or vibrator 33 provide a signal indicative of a forward portion of one temple as well as a second vibrator or LED 32 that is indicative of SOUND from the rear part of the temple the direction of the sound with respect to the individual may be shown from directions north, east, south and west (NESW) as though the individual is facing north and wherein said direction indicator senses and compares the loudness of the sound at each of the microphones and indicates the direction of the weakest sound.

When using LEDs two LEDs on the front and rear part of the right temple are indicated with one LED on the right side of the right lens 15 and the other lens 14 on the left side of the right lens. The reverse is applied for the left temple. Then if the forward indicator on the right and left temple are both activated the sound is coming generally from the front of the user and if the indicators from the right and left temple vibrate the sound is coming from behind the user. Further, if both signals on one side are activated the sound is originated on that side of the user.

Figure 4:
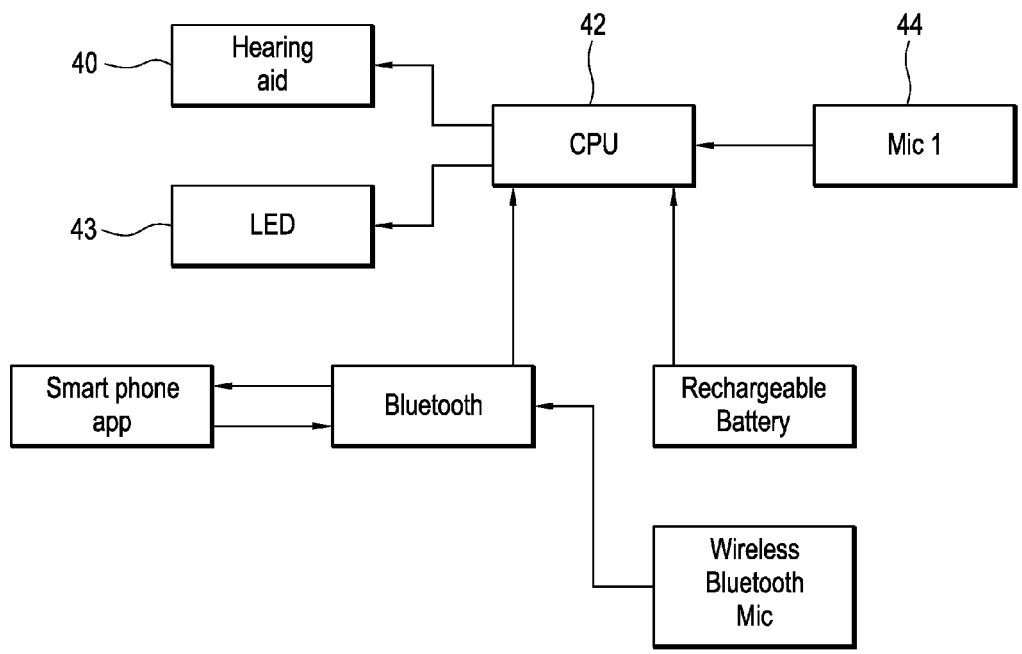
FIG. 4 is a schematic illustration of a further embodiment of the invention.

FIG. 4 indicates a hearing aid 40, CPU 42 and LED 43. A microphone 44 is also connected to the CPU. Further, a rechargeable battery and Bluetooth are both connected to the CPU while the Bluetooth is shown as being connected to a smartphone and a wireless Bluetooth microphone.

Applicant also contemplates the addition of a Bluetooth chip to the spectacle frames for connection to a smartphone or the color of the LEDs. For example, the light warnings on the frame can be set up to light different LEDs in red or green wherein the red indicates the cries of a baby or a low warning such as a car horn. It is also contemplated to add a separate vibrator to indicate a loud warning. In a further embodiment, a wireless microphone can be added and connected to the glasses via Bluetooth and rechargeable batteries are used.

While the invention has been described in connection with its preferred embodiment it should be recognized and understood that the scope of the claims is solely limited by the claim language and not by the specific embodiments.

What is claimed is:

1. A directional indicative hearing apparatus comprising a pair of hearing aids each of which includes a microphone, and an eyeglass frame including a pair of temples for engaging the sides of an individual's head and wherein one of said hearing aids is disposed in or on each of said head engaging temples, a pair of vibrators with one of said vibrators displayed in or on each of said temples and a pair of LEDs disposed on a rear surface of said eyeglass frame with one of said LEDs on a left side of said frame and a second of said LEDs disposed on the right side of said frame, and a central processing unit (CPU) disposed between and operatively connected to each of said hearing aids, each of said vibrators, each of said LEDs and a direction indicator for sensing the direction of a sound emanation and wherein said CPU activates the vibrator and LED in or on the right temple when the sound emanates from the right, activates the left vibrator when the sound emanates from the individual's left and activates both vibrators when the sound emanates from behind the individual and illuminates both LEDs when the sound emanates from in front of the individual.

2. The directional indicative hearing apparatus according to claim 1, in which said CPU is disposed behind the head of the individual using the apparatus.

3. The directional indicative hearing apparatus according to claim 2, in which said direction indicator senses the signal strength of the detected sound and said CPU activates the vibrator and LEDs based on the signal strength.

4. The directional indicative hearing apparatus according to claim 2, in which said direction indicator senses and compares the loudness of the sound at each of the microphones and indicates the direction of the weakest sound.

5. The directional indicative hearing apparatus according to claim 1, which includes four microphones with two microphones in or on each of said temples with one microphone in a forward part of the temple and said second microphone in a rear portion of the temple behind the ear of the individual.

6. A directional indicative hearing apparatus consisting of a pair of hearing aids each of which includes a microphone, and an eyeglass frame including a pair of temples for engaging the sides of an individual's head and wherein one of said hearing aids is disposed in or on each of said head engaging temples, a pair of vibrators with one of said vibrators displayed in or on each of said temples and a pair of LEDs disposed on a rear surface of said eyeglass frame with one of said LEDs on a left side of said frame and a second of said LEDs disposed on the right side of said frame, and a central processing unit (CPU) disposed between and operatively connected to each of said hearing aids, each of said vibrators, each of said LEDs and a direction indicator for sensing the direction of a sound emanation and wherein said CPU activates the vibrator and LED in or on the right temple when the sound emanates from the right, activates the left vibrator when the sound emanates from the individual's left and activates both vibrators when the sound emanates from behind the individual and illuminates both LEDs when the sound emanates from in front of the individual.

7. A directional indicative hearing apparatus consisting of a pair of hearing aids each of which includes a microphone, and an eyeglass frame including a pair of temples for engaging the sides of an individual's head and wherein one of said hearing aids is disposed in or on each of said head engaging temples, a pair of vibrators with one of said vibrators displayed in or on each of said temples and a pair of LEDs disposed on a rear surface of said eyeglass frame with one of said LEDs on a left side of said frame and a second of said LEDs disposed on the right side of said frame, and a central processing unit (CPU) disposed between and operatively connected to each of said hearing aids, each of said vibrators, each of said LEDs and a direction indicator for sensing the direction of a sound emanation and wherein said CPU activates the vibrator and LED in or on the right temple when the sound emanates from the right, activates the left vibrator when the sound emanates from the individual's left and activates both vibrators when the sound emanates from behind the individual and illuminates both LEDs when the sound emanates from in front of the individual; and which includes four microphones with two microphones in or on each of said temples with one microphone in a forward part of the temple and said second microphone in a rear portion of the temple behind the ear of the individual.

8. The directional indicative hearing apparatus according to claim 6, which includes a wireless Bluetooth and microphone connected to the Bluetooth.

\* \* \* \* \*